United States Patent [19]

Stuedemann et al.

[11] Patent Number: 5,423,572
[45] Date of Patent: Jun. 13, 1995

[54] POSITION CONTROL APPARATUS FOR STEERING COLUMN

[75] Inventors: Richard T. Stuedemann; Michael F. Slasinski, both of Saignaw; Indulis H. Piziks, Hemlock, all of Mich.

[73] Assignee: General Motors Corporation, Detroit, Mich.

[21] Appl. No.: 221,609

[22] Filed: Apr. 1, 1994

[51] Int. Cl.⁶ ............................................. B62D 1/18
[52] U.S. Cl. ..................................... 280/775; 74/493
[58] Field of Search ........................... 280/775; 74/493

[56] References Cited

U.S. PATENT DOCUMENTS

| | | | |
|---|---|---|---|
| 4,244,237 | 1/1981 | Sprunger | 74/493 |
| 4,363,499 | 12/1982 | Watanabe et al. | 280/775 |
| 4,472,982 | 9/1984 | Nihikawa | 74/493 |
| 4,541,298 | 9/1985 | Strutt | 74/493 |
| 4,732,050 | 3/1988 | Vollmer | 74/493 |
| 4,774,851 | 10/1988 | Iwanami et al. | 74/493 |
| 4,788,880 | 12/1988 | Kester | 74/493 |
| 5,088,767 | 2/1992 | Hoblingre et al. | 280/775 |
| 5,117,707 | 6/1992 | Kinoshita et al. | 74/493 |
| 5,160,165 | 11/1992 | Hoblingre | 280/775 |
| 5,213,003 | 5/1993 | Speich | 74/493 |
| 5,265,492 | 11/1993 | Snell | 74/493 |

Primary Examiner—Kenneth R. Rice
Attorney, Agent, or Firm—Saul Schwartz

[57] ABSTRACT

A steering column position control apparatus including a stationary bracket having vertical legs on opposite sides of the steering column, a spacer on the steering column between the legs of the bracket, a non-rotatable thrust plate outside of the stationary bracket bearing on one side thereof, a long bolt mounted on the spacer and projecting through the thrust plate, the spacer and a substantially vertical slot in each leg of the bracket, a non-ratable nut outboard of the opposite side of the bracket threaded on the bolt, and a lever outboard of the thrust plate rotatable as a unit with the bolt. A flex plate is attached to the thrust plate between the latter and the lever and includes a flex arm having a detent feature at a distal end thereof. In a closed position of the lever, the detent feature overlaps an edge of the lever for retention thereof in the closed position. In positions of the lever other than the closed position, the detent feature is biased against a flat side of the lever by the flex arm for moderately tensioning the bolt.

3 Claims, 4 Drawing Sheets

POSITION CONTROL APPARATUS FOR STEERING COLUMN

FIELD OF THE INVENTION

This invention relates to position control apparatus for adjustable motor vehicle steering columns.

BACKGROUND OF THE INVENTION

Motor vehicle steering columns which are mounted on a vehicle body for up and down pivotal movement about a geometric center located near the innermost end of the steering column are sometimes referred to as "rake adjustable" or "raked" steering columns. Prior position control apparatus for raked columns typically includes a stationary bracket with vertical legs on opposite sides of the steering column and a lever actuated clamp for squeezing the legs of the bracket against a spacer on the steering column to fictionally capture the position of the steering column relative to the stationary bracket. Usually, the clamp includes a long bolt rotatable with the lever and a nut threaded onto the bolt but restrained against rotation relative to the stationary bracket so that up and down movement of the lever tensions the bolt between the legs of the stationary bracket and the legs squeeze against the spacer. When the screw thread on the bolt is a multiple lead thread, chatter during up and down adjustment may be occur because of the degree to which such multiple lead thread relaxes bolt tension. A raked steering column position control apparatus according to this invention is an improvement over prior control apparatus of the type described above.

SUMMARY OF THE INVENTION

This invention is a new and improved position control apparatus for a motor vehicle raked steering column including a stationary U-shaped bracket having vertical legs on opposite sides of the steering column, a spacer on the steering column between the legs of the bracket, a non-rotatable thrust plate outside of the stationary bracket bearing on one side thereof, a long bolt mounted on the spacer and projecting through the thrust plate and the spacer and through a substantially vertical slot in each leg of the bracket, a non-ratable nut on the opposite side of the bracket from the thrust plate in screw thread engagement on the bolt, and a lever outboard of the thrust plate rotatable as a unit with the bolt. A flex plate is attached to the thrust plate between the latter and the lever and includes a flex arm having a detent feature at a distal end thereof. In a closed position of the lever corresponding to a clamped or captured position of the steering column, the detent feature overlaps an edge of the lever for retention thereof in the closed position. In positions of the lever other than the closed position corresponding to the steering column being released for up and down movement relative to the stationary bracket, the detent feature is biased against a flat side of the lever by the flex arm for tensioning the bolt to minimize chatter.

BRIEF SUMMARY OF THE INVENTION

DESCRIPTION OF A PREFERRED EMBODIMENT

Figure 1:
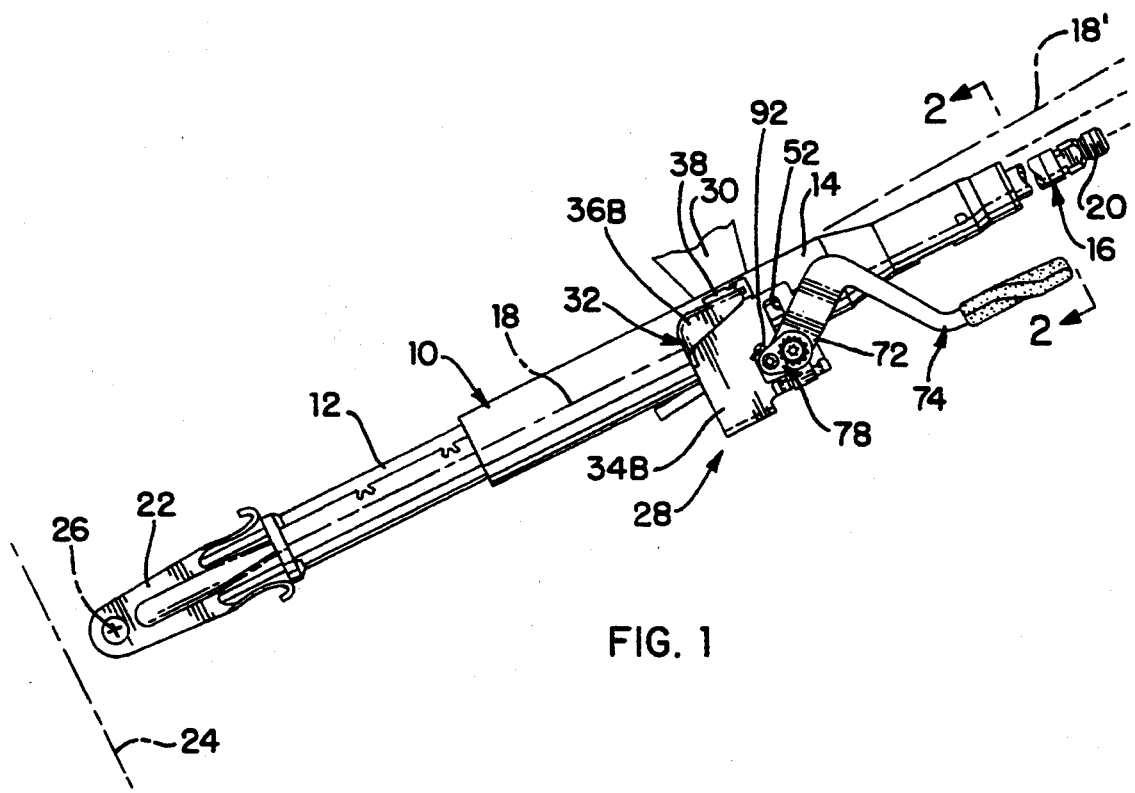
FIG. 1 is a fragmentary elevational view of a motor vehicle raked steering column having control apparatus according to this invention.

Referring to FIG. 1, a motor vehicle raked steering column 10 includes a tubular lower mast jacket 12 and a tubular upper mast jacket 14 telescopically overlapping the lower mast jacket. An energy absorbing apparatus, not shown, is disposed between the mast jackets at the overlap and may have the construction described generally in U.S. Pat. No. 3,392,599, issued 16 Jul. 1968 and assigned to the assignee of this invention. A steering shah 16 is supported on the mast jackets 12, 14 for rotation about a longitudinal centerline 18 of the steering column. A steering wheel, not shown, is attached to a threaded end 20 of the steering shaft.

A fork-shaped clevis 22 is rigidly attached to the lower mast jacket 12 at the lower end thereof. The clevis is connected to a schematically represented front panel 24 of a vehicle body such that the steering column is pivotable up and down about an axis 26 perpendicular to the centerline 18 between a down-limit position, FIG. 1, and an up-limit position represented by a broken-line position 18' of the longitudinal centerline 18. A position control apparatus 28 according to this invention is disposed between the steering column 10 and a structurally rigid element 30 of the vehicle body.

As seen best in FIGS. 1-4, the control apparatus includes a U-shaped steel bracket 32 having a pair of vertical legs 34A-B on opposite sides of the upper mast jacket and a pair of horizontal wings 36A-B. As described in aforesaid U.S. Pat. No. 3,392,599, a capsule 38 having an through hole 40 therein is mounted in a slot 42 in each wing 36A-B. Hanger bolts, not shown, attached to the rigid element 30 of the vehicle body project through the through holes 40. Nuts, not shown, on the hanger bolts below the capsules rigidly affix the capsules to the element 30. In an energy absorbing collapse event of the steering column, the slots 42 in the wings 36A-B release the capsules 38 from the bracket 32.

A spacer 44 having a pair of vertical sides 46A-B juxtaposed the legs 34A-B of the bracket 32 is welded to the upper mast jacket between the legs 34A-B. An aperture 48 in each side 46A-B is aligned on a lateral centerline 50 of the control apparatus and registers with a corresponding one of a pair of substantially vertical slots in the legs 34A-B of the bracket 32, only a single slot 52 being visible in FIGS. 1, 3, 5 and 7. A channel-shaped reinforcement 54 is aligned on the lateral centerline 50 and welded to the spacer 44 between the sides 46A-B thereof.

Figure 2:
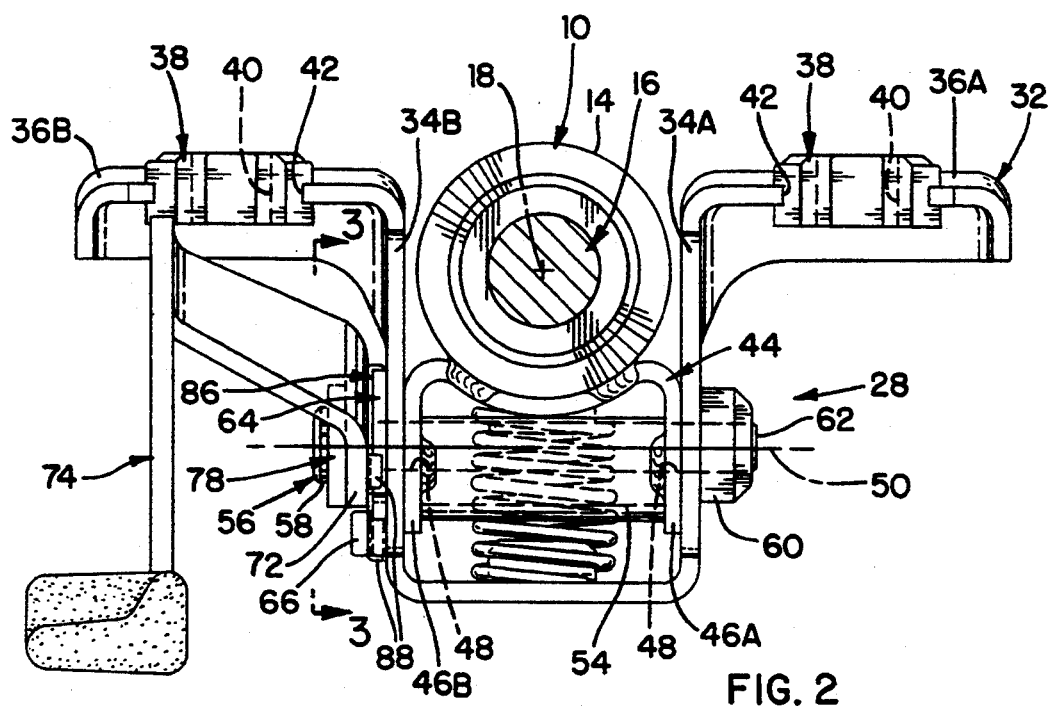
FIG. 2 is an enlarged sectional view taken generally along the plane indicated by lines 2—2 in FIG. 1.

A long bolt 56 of the control apparatus 28 having an enlarged serrated head 58 protrudes through the vertical slots in the stationary bracket, through the apertures 48 in the spacer 44, and through the reinforcement 54. A nut 60, FIG. 2, is received on a reverse or left hand screw threaded end 62 of the bolt 56 outboard or outside the leg 34A of the stationary bracket. Lugs, not shown, on the nut 60 protrude into the vertical slot in the leg 34A to prevent rotation of the nut relative to the stationary bracket without impeding up and down movement of the bolt in the vertical slot.

Figure 7:
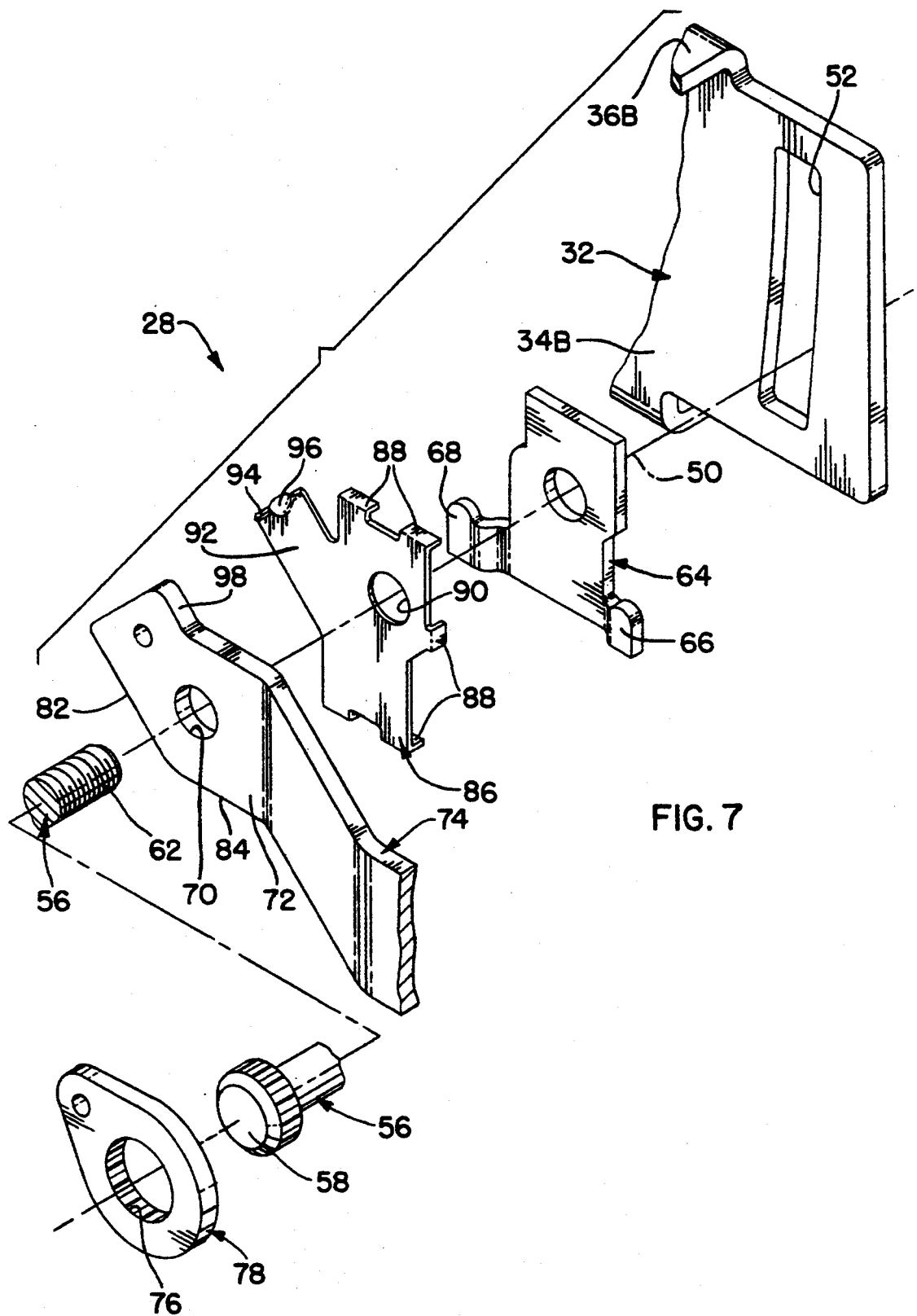
FIG. 7 is a fragmentary, exploded perspective view of the control apparatus according to this invention.

As seen best in FIGS. 2 and 7, the bolt 56 supports a washer-like flat thrust plate 64 on the stationary bracket outside of and in juxtaposition with the leg 34B thereof. The thrust plate has lugs thereon, not shown, protruding into the vertical slot 52 in the leg 34B to prevent rotation of the thrust plate relative to the stationary bracket without impeding up and down movement of the bolt in the vertical slot. The thrust plate has a raised down-stop 66 and a raised up-stop 68.

The bolt 56 projects through a clearance aperture 70, FIG. 7, in a flat end 72 of a lever 74 of the control apparatus whereby the lever is rotatably supported on the bolt and captured between the thrust plate 64 and the enlarged head 58 of the bolt. A serrated aperture 76 of a torque arm 78 is pressed over the serrated head 58 of bolt 56 and is attached to the flat end 72 of the lever by a cap screw 80. The torque arm 78 transfers torque from the lever 74 to the bolt 56 for rotating the bolt relative to the nut 60 about the lateral centerline 50.

The control apparatus as described thus far is generally conventional and operates as follows. When the lever 74 is rotated counterclockwise, FIGS. 1, 2, 3 and 7, the bolt 56 is tensioned between the enlarged head 58 thereof bearing on the leg 34B of the stationary bracket 32 through the thrust plate 64 and the nut 60 bearing against the other leg 34A of the stationary bracket. Maximum bolt tension, sufficient to effect a rigid frictional coupling between the legs 34A-B of the stationary bracket and the sides 46A-B of the spacer, is achieved in a closed position of the lever, FIGS. 1 and 3, when an edge 82 of the flat end of the lever engages the up-stop 68 on the thrust plate.

Figure 5:
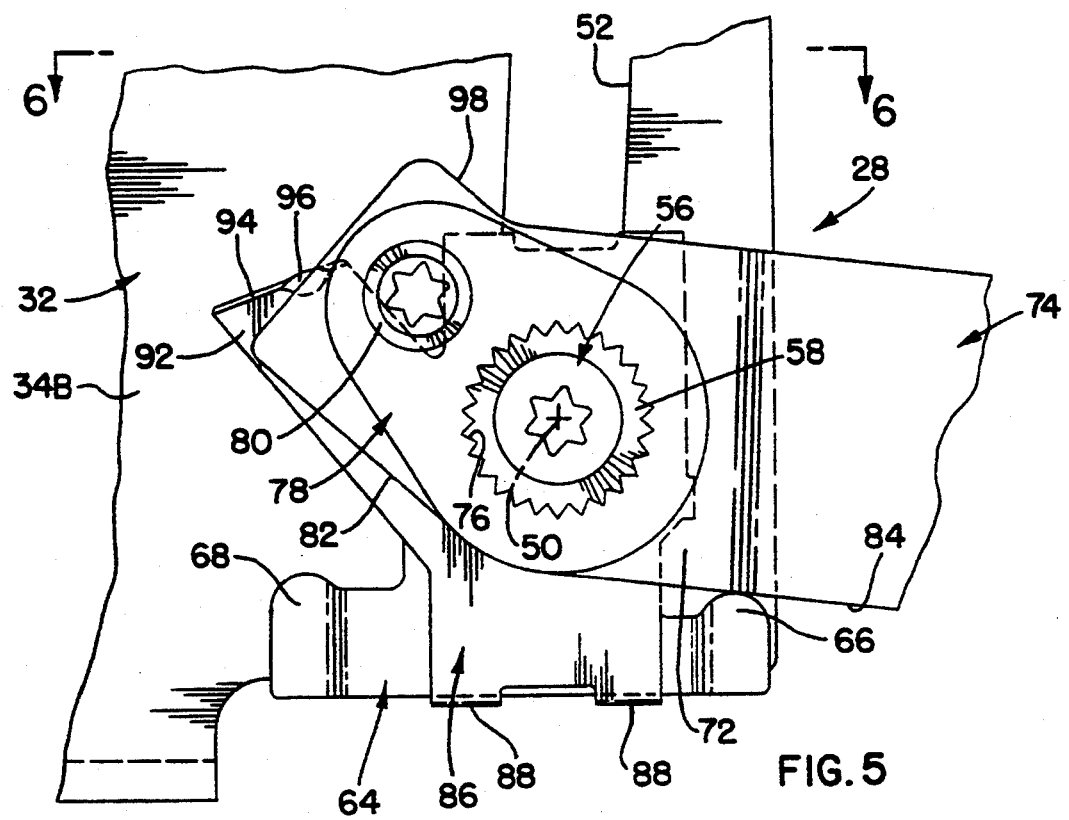
FIG. 5 is similar to FIG. 3 but showing a different position of the actuator lever of the control apparatus according to this invention.
Figure 6:
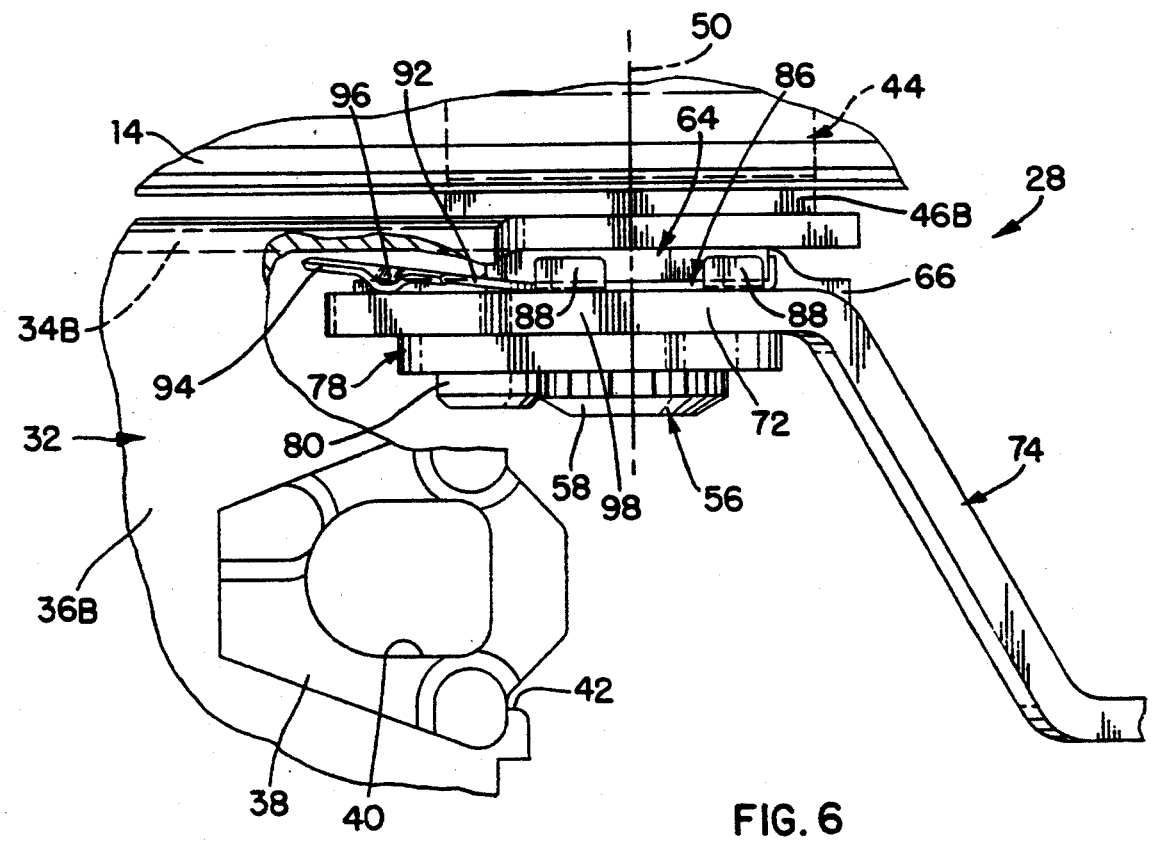
FIG. 6 is a partially broken-away view taken generally along the plane indicated by lines 6—6 in FIG. 5.

Conversely, clockwise rotation of the lever 74 to an open position, FIGS. 5 and 6, characterized by engagement of an edge 84 of the lever on the down-stop 66, relaxes bolt tension to relieve the aforesaid friction coupling. Where bolt tension in the open position of the lever 74 is over-relaxed, e.g. when the screw thread on the bolt 56 is a multiple lead thread, misalignment of the bolt relative to the lateral centerline 50 may manifest itself as chatter or unsteady movement of the steering column when an operator uses the steering wheel to lift or lower the steering column to a comfortable position.

A flat flex plate 86 of the control apparatus 28 according to this invention fits flush against the thrust plate 64 between the latter and the flat end 72 of the lever 74. A plurality of wrap-around tabs 88 on the flex plate grasp the thrust plate and unite the two plates for easy handling before final assembly of the control apparatus and for preventing rotation of the flex plate relative to the stationary bracket 32. The bolt 56 projects through a clearance aperture 90 in the flex plate.

The flex plate further includes a resilient flex arm 92 extending beyond an edge of the thrust plate inboard of the flat end 72 of the lever 74. The flex arm is coplanar with the remainder of flex plate when undisturbed and terminates at a lip 94 extending across the arm having a detent-defining dimple 96 therein.

The flex plate 86 operates as follows. When the lever 74 is in its open position with the edge 84 against the down-stop 66, FIGS. 5-6, the flat end 72 of the lever 74 overlaps the flex arm. In that circumstance, the dimple 96 bears against the flat end of the lever to effect resilient flexure of the flex arm 92. The reaction force of the flex arm on the lever 74, applied at the dimple 96, spreads the lever 74 and the bolt head 58 relative to the thrust plate 64 until the nut 60 engages the leg 34A of the stationary bracket. The moderate tension thus induced in the bolt 56 between the legs of the stationary bracket is sufficient to maintain alignment of the bolt relative to the lateral centerline 50 thereby to minimize chatter during up and down adjustment of the steering column.

Figure 3:
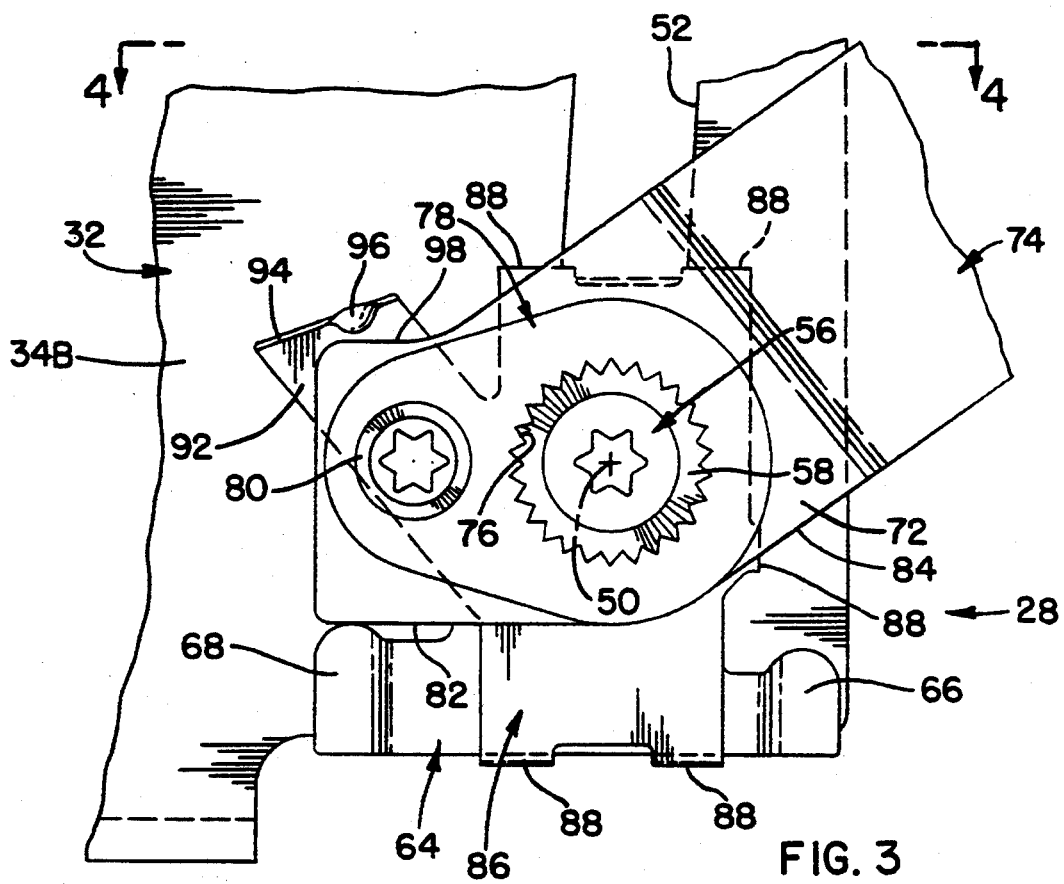
FIG. 3 is a view taken generally along the plane indicated by lines 3—3 in FIG. 2.
Figure 4:
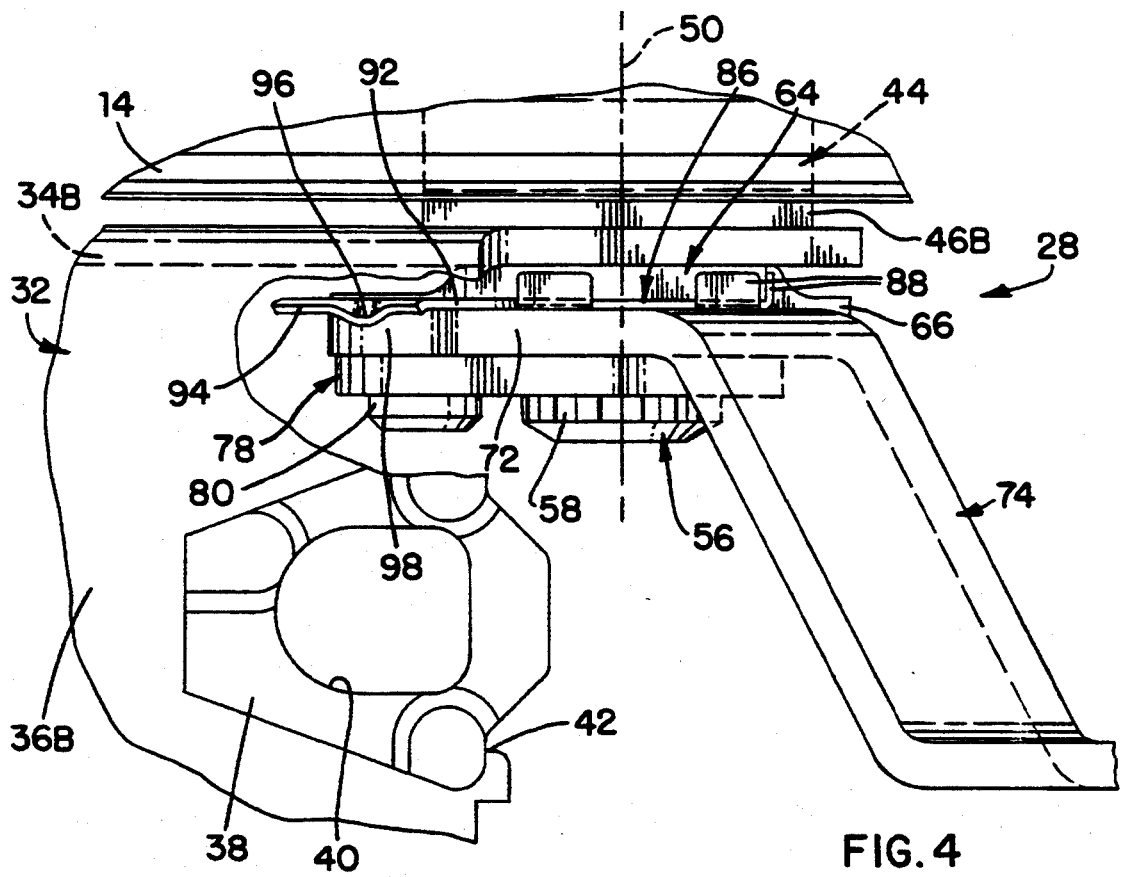
FIG. 4 is a partially broken-away view taken generally along the plane indicated by lines 4—4 in FIG. 3.

The aforesaid flexure of the flex arm 92 persists until the lever 74 is substantially in its closed position, FIGS. 1, 3 and 4, with the edge 82 against the up-stop 68. At about the instant the lever achieves its closed position, an edge 98 of the lever 74 clears the dimple 96 on the flex arm whereupon the flex arm relaxes to its position flush against the flat end 72 of the lever with the dimple 96 overhanging the edge 98. Transition of the dimple from on the flat end 72 to off the flat end 72 affords a tactile indication of achievement of the closed position of the lever. In addition, in the closed position of the lever, the dimple overhangs the edge 98 to resiliently block movement of the lever 74 toward its open position.

While this invention has been described in terms of a preferred embodiment thereof, it will be appreciated that other forms could readily be adapted by one skilled in the art. Accordingly, the scope of this invention is to be considered limited only by the following claims.

The embodiments of the invention in which an exclusive property or privilege is claimed are defined as follows:

1. In a raked steering column control apparatus including
   a stationary bracket having a first vertical leg with a substantially vertical slot therein and a second vertical leg with a substantially vertical slot therein disposed on opposite sides of a mast jacket of said steering column,
   a spacer on said mast jacket between said first and said second legs of said stationary bracket having a first side juxtaposed said first leg and a second side juxtaposed said second leg,
   each of said first and said second legs of said spacer having an aperture therein in register with said substantially vertical slot in the corresponding one of said first and said second legs of said stationary bracket,
   a bolt aligned on a lateral centerline of said control apparatus extending through said apertures in said spacer and said substantially vertical slots in said legs of said stationary bracket and having a screw threaded end,
   a nut on said screw threaded end of said bolt outboard of said first leg of said stationary bracket and restrained against rotation relative to said stationary bracket, and
   a lever rigidly attached to said bolt outboard of said second leg of said stationary bracket so that rotation of said lever in a first direction about said lateral centerline to a closed position effects maximum tensioning of said bolt between said first and said second legs of said stationary bracket and in a second direction about said lateral centerline to an open position effecting maximum relaxation of tension in said bolt,
   the improvement comprising:

a planar flex plate mounted on said stationary bracket outboard of said second leg thereof and restrained against rotation relative thereto about said lateral centerline, means defining a planar resilient flex arm on said flex plate, and detent means on said flex arm retaining said lever in said closed position thereof and exerting on said lever whenever said lever is displaced from said closed position a reaction force vector parallel to said lateral centerline to effect minimum tensioning of said bolt between said first and said second legs of said stationary bracket.

2. The raked steering column control apparatus recited in claim 1 wherein said detent means on said flex arm includes:

a lip on said flex arm, and a detent defining dimple on said lip.

3. The raked steering column control apparatus recited in claim 2 further including:

a planar thrust plate disposed between said flex plate and said second leg of said stationary bracket restrained against rotation relative to said stationary bracket, and means on said planar flex plate defining a plurality of integral tabs bent around said thrust plate for attaching said flex plate to said thrust plate.

* * * * *